United States Patent [19]
Crudgington, Jr.

[11] Patent Number: 4,477,069
[45] Date of Patent: Oct. 16, 1984

[54] ELECTRONIC AMUSEMENT CENTER

[76] Inventor: Cleveland B. Crudgington, Jr., 222 N. Myrtle Ave., Monrovia, Calif. 91016

[21] Appl. No.: 424,560

[22] Filed: Sep. 27, 1982

[51] Int. Cl.³ .............................................. A63J 3/00
[52] U.S. Cl. .................................... 272/3; 273/85 G; 273/DIG. 28
[58] Field of Search .................. 273/1 E, 3 R, 85 G, 273/237, DIG. 28; 434/43, 44, 307, 323; 340/729

[56] References Cited

U.S. PATENT DOCUMENTS

| | | | |
|---|---|---|---|
| 4,162,582 | 7/1979 | McGraw et al. | 434/44 |
| 4,193,598 | 3/1980 | Freese | 273/313 |
| 4,335,809 | 6/1982 | Wain | 273/DIG. 28 |
| 4,348,186 | 9/1982 | Harvey et al. | 434/44 |
| 4,372,558 | 2/1983 | Shimamoto et al. | 273/237 |

OTHER PUBLICATIONS

"Playmeter" (Pinball for the TV Generation) Apr., 1979, p. 73.

Primary Examiner—Richard C. Pinkham
Assistant Examiner—MaryAnn Stoll

[57] ABSTRACT

An electronic entertainment apparatus for a multiple number of consoles, each of which is operated by one or more participants. A variety of controls at each console enable the participant to regulate his movements within the computer simulated environment, also shared by all other participants. These displays, at all consoles, appear three-dimensional, as if each participant were himself moving through a scene that is particular to his vantage point in this simulated environment. Through such means participants may interact with one another, thus creating a whole new kind of entertainment activity. All consoles are electrically connected to a separately located master computer system, and each game or performance is generated by the program within the master computer system. The program can be easily replaced with another, thereby changing the entertainment in much the same manner as changing a reel of film in a movie theater. This novel concept in electronic theater entertainment is hereafter referred to as ARCADIUM.

8 Claims, 6 Drawing Figures

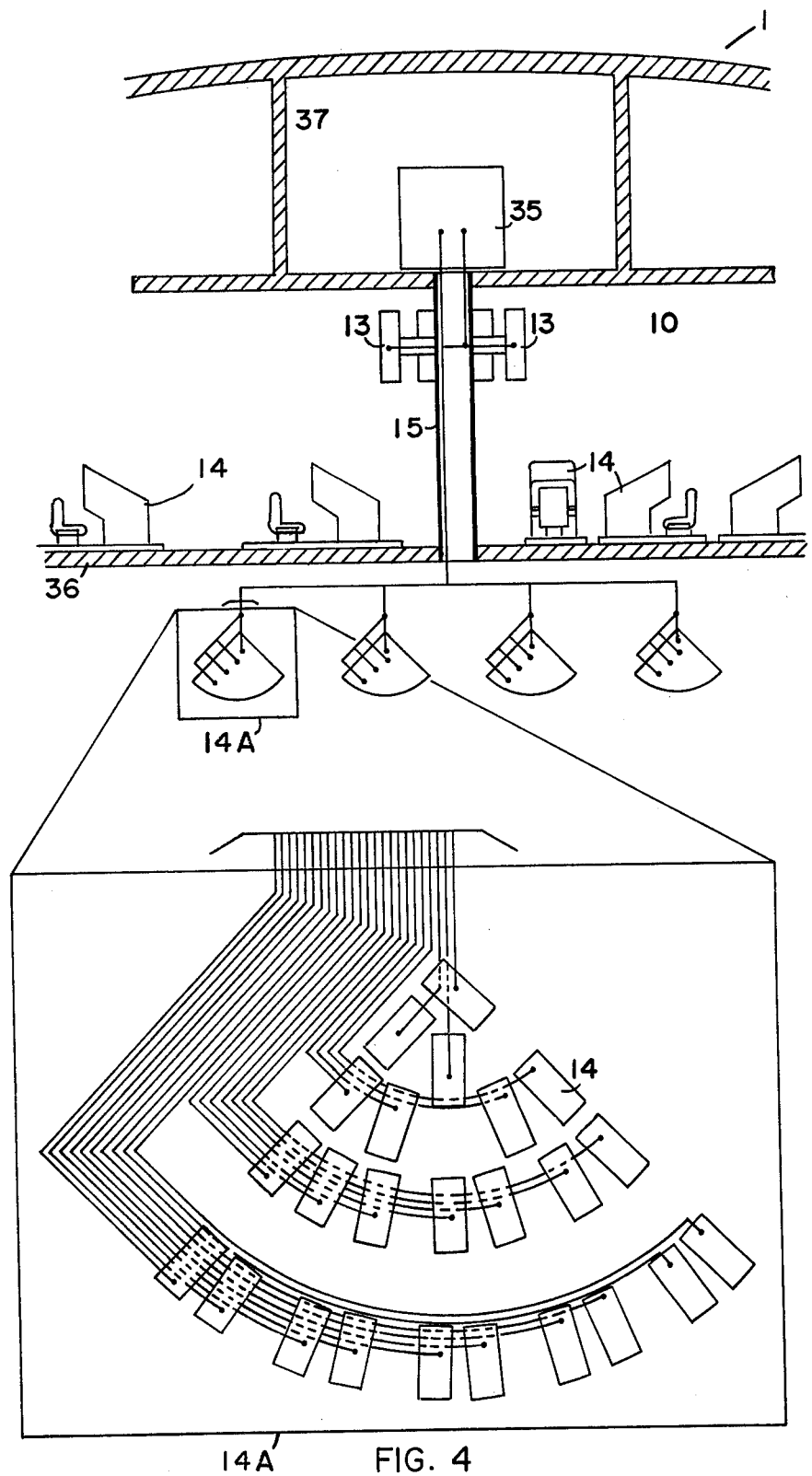

ELECTRONIC AMUSEMENT CENTER

BACKGROUND AND SUMMARY OF THE INVENTION

The concept of computer generated video games is not new. The present invention, however, relates to an electronic thister entertainment amusement center, hereafter referred to as ARCADIUM, that employs numerous identical consoles with video, audio and possibly a vibratory device for each console seat. Each console contains a variety of controls for operating a representative figure or object within the computer-simulated field displayed on the viewing screen of all consoles. The display seen on each console depicts a different three dimensional perspective for each viewer. The view as seen by one participant is a simulated scene containing all figures (or objects) that represent other participants within the first player's line of sight. The other participants, meanwhile, observe the first participant as a figure (or object) within their line of sight. The scene, along with the figures (or objects), appear three-dimensional and in motion. A master computer system is electrically connected to all consoles, and with its programming, provides all the necessary data to every console, that gives all participants the illusion of moving and interacting within an imaginary environment. Thus, the stage is set for a form of entertainment not previously developed with present video, computer technology.

All consoles and the master computer system are located at one facility. The consoles are preferably in the same room, while the master computer system is in a separate room not far away. The styling of the ARCADIUM is important and should reflect a positive, futuristic and uncluttered atmosphere so that the impact on the public will be exciting and wholesome.

The simulated visual, audio and (seat) vibratory environment is controlled by the master computer's program. The consoles and master computer system are designed to accept different programs which are easily inter-changeable. By changing the program, performances can be designed for a variety of entertainment without hardware modifications within the consoles, master computer system or the facility housing this equipment. Performances can be designed so that participants enter at random, or begin at the same time, depending on the type of activity. Performances can be made strictly for entertainment, or for competative team play. Performances can be minimally altered to accomodate varying skill levels, or can be dramatically different, thereby creating completely unique simulated events. Programs can be changed as easily and quickly as a movie reel in a movie house. So with minimal cost, new forms of entertainment can be brought to ARCADIUM keeping public interest high. As with producing a movie film, creating programs will be expensive, however, once produced, they can be easily duplicated, thereby supplying new entertainment to perhaps many ARCADIUMS at relatively low cost.

BRIEF DESCRIPTION OF THE DRAWINGS

FIG. 4 illustrates a one-line wiring diagram on a partial elevation drawing of the facility repesented in FIGS. 1 and 2, showing interconnections between the consoles and the master computer system, another embodiment of the present invention.

THE FACILITY

The architecture and layout of the facility is described in some detail within the scope of this invention as an example of a method in which the desired atmosphere may be created. The video game as a team sporting event or as theater entertainment, is a totally new concept. The public's impression will be heavily influenced by the kind of atmosphere surrounding the event. Like the entertainment, the structure will be designed to inspire and excite the participants. The following description is intended to provide an insight on how this invention might be successfully presented to the public as a new type of theater entertainment.

Figure 1:
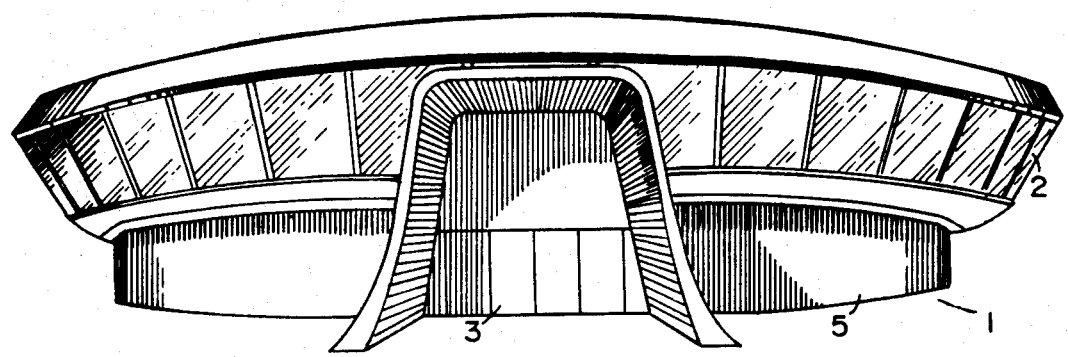
FIG. 1 illustrates an external elevation view of a facility that may house the electronic entertainment apparatus that pertains to the present invention.
Figure 2:
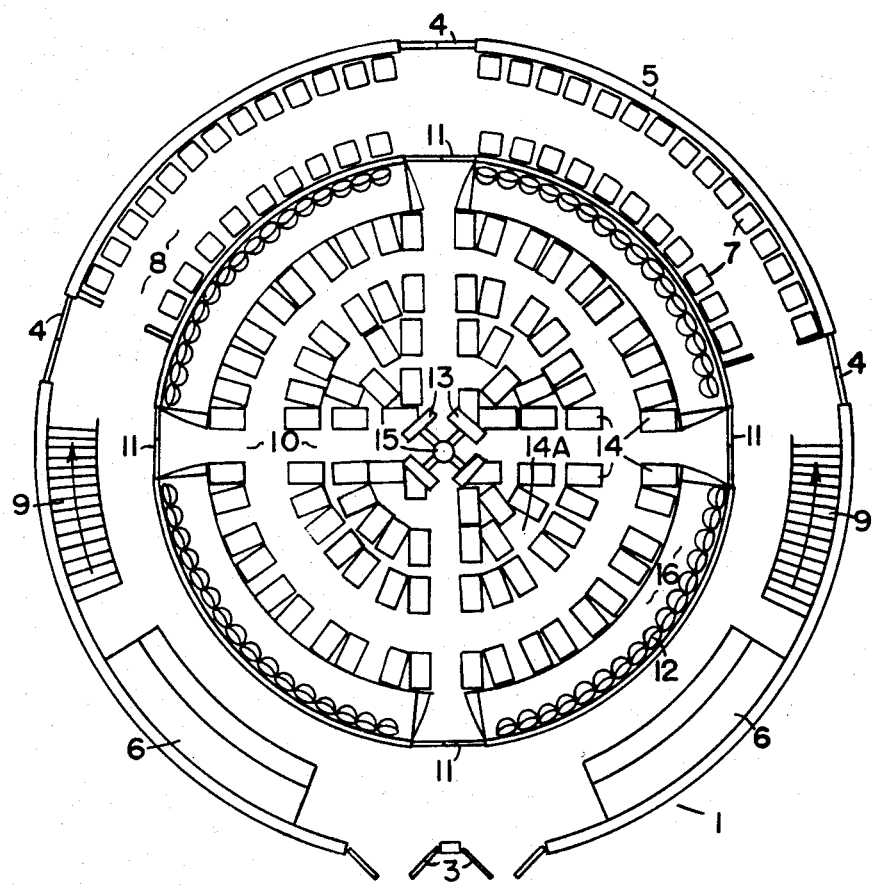
FIG. 2 illustrates a sample first floor plan of a facility that can house the present invention.

An ultra-modern building is constructed especially for housing the electronic entertainment apparatus described herein. The facility, as previously mentioned, may be referred to as an ARCADIUM. In this example, illustrated in FIG. 1, the building is about the size of a large movie theater designed to accommodate about a hundred consoles. The structure 1 is round, two stories with interesting angles about the second level that project outward, of chrome trim and large tinted glass windows 2. The first level illustrated in FIG. 2, has no windows at all, only a futuristic-looking main entrance 3, with occasional emergency exits 4 around the circular wall 5. Customers walk through the main entrance 3 and are received by attendants at counters 6. As the customer "checks in", he will be assigned a number designating his turn for "play" if the center is filled to capacity. While the customer is waiting his turn, he may decide to play one of the many contemporary games 7 that flank both sides of the circular hallway 8 circumventing the entire ground floor. At various locations around this hallway, stairs 9 lead up to the second level, not shown. A player may wait in the room which houses all the consoles, called the "arena" 10.

On the first floor, theater-style swinging doors 11 lead from the circular hallway into the "arena" room. This room is also circular and occupies the majority of floor space on the ground level. Rows of movie theater chairs 12 for waiting participants circle the back of this room, facing towards the center. While consoles 14 also face the center of the arena in circular rows around the room full range audio system fills the arena with corresponding sounds from the performance. Waiting participants gaze at large monitors 13 suspended at the center of the room illuminating scenes from the performance. Isles at every 90 degrees lead to the exit doors 11 around the room, dividing the consoles 14 into four quadrants 14A, where each quadrant 14A represents a team for team play.

Monitors 13 will be supported by futuristic spires jetting outward from a large column 15 at the center of the "arena" room 10. The level of general lighting is low in the arena, just sufficiently bright so participants can find their way to the consoles. Illuminated number displays (not shown) will be placed around the room so waiting participants can easily see when their turns arrive. The movie-style chairs 12 in the rear of the arena should be several steps above the level of the consoles on a raised platform 16, so that waiting participants can observe the monitors 13 without obstruction.

THE CONSOLE

As with the structure housing the consoles, the design of the consoles should also inspire and excite the participants. The description of the console given herein, should not be construed or interpreted as the only configuration adaptable. Nor is the design given below intended to be considered a novel feature of this invention. Rather, the following explanation is intended to provide insight on how a console could be equipped to accommodate the features of this invention.

Figure 3A:
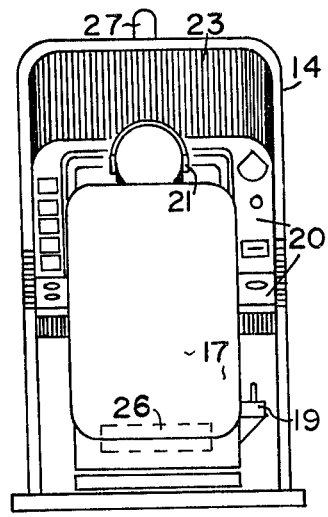
FIG. 3A illustrates a rear view of the console, one segment of the electronic entertainment apparatus.
Figure 3B:
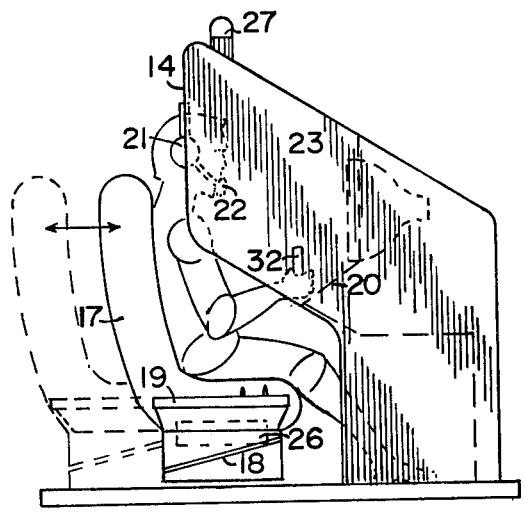
FIG. 3B illustrates a side view of the console.

FIG. 3A illustrates a rear view of the console 14 and FIG. 3B illustrates a side view. The console 14 is to appear futuristic-looking and be well-constructed. The console 14 may differ from the typical upright or booth-type console seen in contemporary arcades. In this example, the player sits in a padded bucket seat 17 that has adjustments 18 on the seat panel 19, for height and distance to the console control panel 20. There are no speakers. Instead, a stereo headset 21 plugs into the seat panel 19 for full fidelity sound effects. The more experienced participants may well bring their own headsets that include a microphone 22 for performances where communication with team members is important. The console's design shall screen out extraneous sights that might distract the participant's attention. In this design, the player sits within a hood 23 which blocks peripheral vision.

Figure 3C:
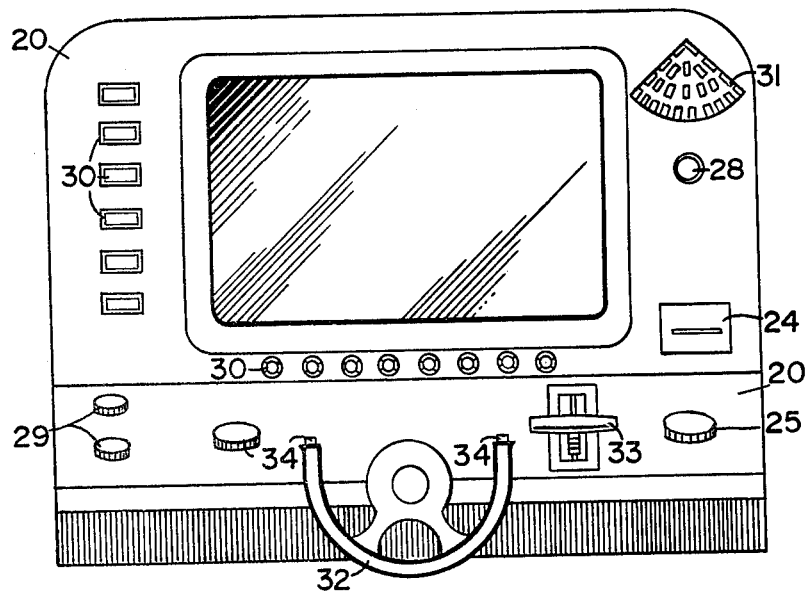
FIG. 3C illustrates the console control panel with its display screen and various controls.

Other features are likely to make the ARCADIUM console unique as illustrated in FIG. 3C. Rather than inserting money or tokens, the participant may be required to insert his membership card into a card reader 24, and depress a start button 25 to activate the console. There are several advantages. The card will identify the participant for billing or scoring information. Coin collection and counting is eliminated, as well as the need to make change. The console may include a device 26 for vibrating the bucket seat with intensity corresponding to various rumbles and roars which are part of the performance. A light 27 is placed on top of every console that illuminates when a player is finished. This light 27 will remain "on" until the console is again activated, providing the next participant with a way to identify the vacated console. Once the console is reactivated the light 27 on top of the console 14 will go out. The participant may be able to activate a "call" switch 28 that causes the console light 27 to flash, thereby notifying an attendent for assistance. The console would include separate loudness controls 29 for intercom and for simulated action sounds. Volume can be regulated from soft to loud, however, neither control would entirely cut out the sound.

In this example, the consoles are designed for games that involve the operation of "flying vehicles". In other words, all programs developed for the master computer system will require that each member of the audience pilots his or her own imaginary flying vehicle within a simulated space environment. To accomodate this fantasy console panels 20 may include a variety of warning and indicator lights 30, such as: low fuel warning; radar warning (illuminates when enemy approaches); low altitude warning; and so on. An illuminated display 31 shows all team members remaining in the game. A steering wheel 32 or joy stick would allow the imaginary space craft to be maneuvered, while a throttle control 33 would regulate speed. Firing buttons 34 on the console panel, and perhaps on the steering mechanism, would complete the array of console controls.

THE MASTER COMPUTER

While the consoles are like the eyes and the ears, the master computer is the central nerve system of ARCADIUM. Illustrated in FIG. 4, the master computer system 35 provides continuous data to all consoles 14 within the center so that every participant is given the illusion that he or she is moving through time and space, from his own particular perspective, and interacting with other participants within this imaginary environment. As with the consoles, the hardware and technology is presently available for the master computer.

Unlike video games found in contemporary arcades, a master computer 35 operates all consoles 14 in the arena room 10, and is preferably located separately . . . in a computer control room 37. Because of the importance of this computer 35 and its program, a second back-up computer could be available in the event that the first unit malfunctioned. The transference from the first computer to the back-up, may or may not be detectable in the display. The master computer system concept is an object of the present invention and is a necessity for ARCADIUM. Several advantages to the master computer system are evident. First, the sophistication of the computer simulation can be superior for the same cost per console 14. The hardware selected for the master computer system 35 would be economically unfeasible if for only one console 14. But with many consoles 14A, the master computer system 35 can be of the capacity that will provide a life-like moving three dimensional picture, with excellent definition of graphics and the appearance of smooth motion. A second advantage to the master computer system 35, is the ability to change programs and consequently obtain entirely different games or performances for participants to enjoy. No changes in hardware need be required. Still another advantage is the ability to upgrade the entire ARCADIUM system by replacing ONLY the master computer system with a technologically improved unit utilizing the latest computer advancements. Another possibility with the master computer system 35 is the capability of linking together two ARCADIUM centers for team sporting events. A facility in Los Angeles, for example, could play a facility in New York, without either team having to travel from home. This capability in communications for "long distance play", would utilize existing state of the art technology.

In this example electrical wiring from consoles 14 would run in the floor 36 acressible through channels with removable cover plates. Wiring would then run up to the second level 2 through a central column 15, and into the master computer room 37 directly above.

What is claimed is:

1. An electronic entertainment apparatus including a plurality of consoles, wherein each console includes display means and controls for operation by at least one participant, means for providing a singular entertainment activity shared by all participants operating said controls at said consoles within said electronic entertainment apparatus, wherein other said consoles are at least two in number, means for presenting a perspective view using said display means at each console, wherein said perspective view is particular to each respective participant's viewing position within said singular entertainment activity, means for creating apparent motion of the participant through the continuing alteration of said perspective view, and said apparent motion being manipulated by said participant using said controls on said console, means for presenting said perspective view at each console wherein said perspective view appears three-dimensional and as if said participant(s) at each console were moving within said perspective view, means for representing other said consoles which are within the perspective view displayed at first said console as movable objects or figures, means enabling simultaneous interaction between participants sharing in said singular entertainment activity when said movable objects or figures appear within said perspective view at each of said consoles.

2. An electronic entertainment apparatus as set forth in claim 1, wherein each console within said apparatus is electrically connected to a master computer system that provides coordinated information to each of said consoles.

3. An electronic entertainment apparatus as set forth in claim 2, wherein said master computer system accepts a plurality of programs, each program contains information necessary to provide all the unique conditions for a specific entertainment activity, means for changing said program resulting in said specific entertainment activity being modified or changed at least in part.

4. An electronic entertainment apparatus as set forth in claim 1, including means enabling simultaneous game play by all participating players sharing in said singular entertainment activity, and means for non-participating observers to monitor game play, wherein said observers view a monitor separate from the displays which participants view.

5. An electronic entertainment apparatus as set forth in claim 1, wherein said entertainment apparatus includes means to allow team competitions.

6. An electronic entertainment apparatus as set forth in claim 5, wherein said entertainment apparatus includes means for broadcasting said team competitions as a televised sporting event.

7. An electronic entertainment apparatus as set forth in claim 2, including means for linking the master computer system at one location through available communication channels to the master computer system at a second location, thereby providing the means for a team at said first location to compete against a team at said second location, and each said master computer system including programs at both locations with means for players to experience said singular entertainment activity as if all players were operating at a single location.

8. An electronic entertainment apparatus as set forth in claim 7, wherein said team competition includes means for broadcasting the entertainment as a televised sporting event.

* * * * *

UNITED STATES PATENT AND TRADEMARK OFFICE
CERTIFICATE OF CORRECTION

PATENT NO. : 4477069
DATED : 10/16/84
INVENTOR(S) : Cleveland Benedict Crudgington Jr.

It is certified that error appears in the above-identified patent and that said Letters Patent is hereby corrected as shown below:

In column 1, line 8, "thister entertainment amusement center," should be deleted and --entertainment apparatus,-- inserted therefor.

In column 1, line 33, after "is", but before "in" --preferably-- should have been inserted.

In column 1, line 46, after "the", but before "housing", "facility" should have been deleted, and --structure-- substituded.

Signed and Sealed this

Thirtieth Day of July 1985

[SEAL]

Attest:

DONALD J. QUIGG

Attesting Officer

Acting Commissioner of Patents and Trademarks